(12) United States Patent
Gallo et al.

(10) Patent No.: US 9,201,641 B2
(45) Date of Patent: Dec. 1, 2015

(54) METHOD AND SYSTEM FOR UPGRADING THE SOFTWARE OF A TELECOMMUNICATION TERMINAL, IN PARTICULAR OF A VIDEO TELEPHONE, AND RELATED COMPUTER PROGRAM PRODUCT

(75) Inventors: Secondo Gallo, Turin (IT); Andrea Bergaglio, Turin (IT); Margherita Miali, Martina Franca (IT)

(73) Assignee: Telecom Italia S.p.A., Milan (IT)

( * ) Notice: Subject to any disclaimer, the term of this patent is extended or adjusted under 35 U.S.C. 154(b) by 2013 days.

(21) Appl. No.: 11/793,803

(22) PCT Filed: Dec. 24, 2004

(86) PCT No.: PCT/EP2004/014715
§ 371 (c)(1),
(2), (4) Date: Jul. 25, 2007

(87) PCT Pub. No.: WO2006/066612
PCT Pub. Date: Jun. 29, 2006

(65) Prior Publication Data
US 2008/0134166 A1    Jun. 5, 2008

(51) Int. Cl.
*G06F 9/44*        (2006.01)
*G06F 9/445*       (2006.01)
*H04M 11/00*       (2006.01)
*H04M 1/725*       (2006.01)
(Continued)

(52) U.S. Cl.
CPC .. *G06F 8/64* (2013.01); *G06F 8/65* (2013.01); *H04L 67/34* (2013.01); *H04M 1/72525* (2013.01)

(58) Field of Classification Search
None
See application file for complete search history.

(56) References Cited

U.S. PATENT DOCUMENTS 3,975,595 A * 8/1976 Berube et al. ............ 379/216.01
4,475,189 A * 10/1984 Herr et al. ..................... 370/261
(Continued)

FOREIGN PATENT DOCUMENTS

GB        2 348 721 A        10/2000

OTHER PUBLICATIONS

Cisco Unified Video Advantage, "INTRODUCTION, New Video is as Easy as Making a Phone Call", http://www.cisco.com/en/US/products/sw/voicesw/ps5662/, pp. 1-2, (May 24, 2007).
(Continued)

*Primary Examiner* — Tuan Q. Dam
*Assistant Examiner* — Zheng Wei
(74) *Attorney, Agent, or Firm* — Finnegan, Henderson, Farabow, Garrett & Dunner, L.L.P.

(57) ABSTRACT

A method of upgrading the software of a terminal of a telecommunication network, in particular a wired video telephone, includes the steps of periodically sending a first signal from the terminal to a service center via an intelligent network, the first signal including a service access code containing information related to the current software version installed on the terminal; checking, in a data base containing information on the different software versions available in the service center, if the current software version corresponds to a correct software version; sending from the service center to the terminal a second signal, in the form of a DTMF sequence, indicative of the result of the step of checking; possibly displaying a message on the terminal to inform the user that the software has to be upgraded; and remotely downloading the software.

26 Claims, 9 Drawing Sheets

(51) Int. Cl.
*H04B 1/18* (2006.01)
*H04L 29/08* (2006.01)

(56) References Cited

U.S. PATENT DOCUMENTS

| | | | | |
|---|---|---|---|---|
| 4,540,850 | A * | 9/1985 | Herr et al. | 379/88.19 |
| 5,086,461 | A * | 2/1992 | Thorn et al. | 379/230 |
| 5,369,680 | A * | 11/1994 | Borbas et al. | 379/10.02 |
| 5,442,764 | A * | 8/1995 | Einhorn et al. | 717/178 |
| 5,457,732 | A * | 10/1995 | Goldberg | 340/7.23 |
| 5,793,845 | A * | 8/1998 | Hollywood et al. | 379/88.22 |
| 5,812,655 | A * | 9/1998 | Pickeral et al. | 379/221.14 |
| H1802 | H * | 9/1999 | Erwin et al. | 379/243 |
| H1814 | H * | 11/1999 | Browning et al. | 379/242 |
| 5,982,851 | A * | 11/1999 | Kennedy et al. | 379/21 |
| 5,999,525 | A * | 12/1999 | Krishnaswamy et al. | 370/352 |
| H001837 | H * | 2/2000 | Fletcher et al. | 455/433 |
| 6,038,310 | A * | 3/2000 | Hollywood et al. | 379/283 |
| 6,101,327 | A * | 8/2000 | Holte-Rost et al. | 717/170 |
| H1921 | H * | 11/2000 | Fletcher et al. | 455/433 |
| 6,161,128 | A * | 12/2000 | Smyk | 709/205 |
| 6,167,567 | A * | 12/2000 | Chiles et al. | 717/173 |
| 6,233,323 | B1 * | 5/2001 | Ali et al. | 379/93.27 |
| 6,282,709 | B1 * | 8/2001 | Reha et al. | 717/175 |
| 6,314,567 | B1 * | 11/2001 | Oberhauser et al. | 717/170 |
| 6,330,613 | B1 * | 12/2001 | Vlajnic et al. | 709/234 |
| 6,351,218 | B1 * | 2/2002 | Smith | 340/601 |
| 6,377,815 | B1 * | 4/2002 | Krishnan et al. | 455/553.1 |
| 6,510,209 | B1 * | 1/2003 | Cannon et al. | 379/88.13 |
| 6,545,697 | B1 | 4/2003 | Parker et al. | |
| 6,597,667 | B1 * | 7/2003 | Cerna | 370/260 |
| 6,621,831 | B1 * | 9/2003 | Linz | 370/480 |
| 6,771,751 | B1 * | 8/2004 | Kasturi et al. | 379/93.27 |
| 6,781,979 | B1 * | 8/2004 | Ebata et al. | 370/338 |
| 6,788,331 | B1 * | 9/2004 | Sacca | 348/14.01 |
| 6,795,108 | B2 * | 9/2004 | Jarboe et al. | 348/14.09 |
| 6,831,915 | B1 * | 12/2004 | Beyschlag et al. | 370/352 |
| 6,871,346 | B1 * | 3/2005 | Kumbalimutt et al. | 718/104 |
| 6,996,817 | B2 * | 2/2006 | Birum et al. | 717/170 |
| 6,996,818 | B2 * | 2/2006 | Jacobi et al. | 717/170 |
| 7,092,406 | B2 * | 8/2006 | Sharma et al. | 370/493 |
| 7,093,244 | B2 * | 8/2006 | Lajoie et al. | 717/168 |
| 7,171,616 | B1 * | 1/2007 | Berstis | 715/205 |
| 7,216,343 | B2 * | 5/2007 | Das et al. | 717/168 |
| 7,305,672 | B2 * | 12/2007 | Vincent | 717/172 |
| 7,409,435 | B1 * | 8/2008 | Bayerl et al. | 709/217 |
| 7,458,073 | B1 * | 11/2008 | Darling et al. | 717/168 |
| 7,461,374 | B1 * | 12/2008 | Balint et al. | 717/174 |
| 7,493,613 | B2 * | 2/2009 | D'Souza et al. | 717/173 |
| 7,506,335 | B1 * | 3/2009 | Wooff et al. | 717/173 |
| 7,516,450 | B2 * | 4/2009 | Ogura | 717/168 |
| 7,624,393 | B2 * | 11/2009 | Egan et al. | 717/173 |
| 7,685,598 | B1 * | 3/2010 | Badenell et al. | 718/104 |
| 7,761,871 | B2 * | 7/2010 | Edwards et al. | 717/176 |
| 7,805,722 | B2 * | 9/2010 | Mori et al. | 717/178 |
| 7,831,967 | B2 * | 11/2010 | Won et al. | 717/172 |
| 7,913,246 | B2 * | 3/2011 | Hammond et al. | 717/173 |
| 8,065,673 | B2 * | 11/2011 | D'Souza et al. | 717/173 |
| 8,079,028 | B2 * | 12/2011 | Seki et al. | 717/171 |
| 2001/0036821 | A1 * | 11/2001 | Gainsboro et al. | 455/410 |
| 2002/0016959 | A1 * | 2/2002 | Barton et al. | 717/178 |
| 2002/0026495 | A1 * | 2/2002 | Arteaga | 709/217 |
| 2002/0057765 | A1 * | 5/2002 | Hyziak et al. | 379/52 |
| 2002/0065872 | A1 * | 5/2002 | Genske et al. | 709/202 |
| 2002/0101854 | A1 * | 8/2002 | Siegrist et al. | 370/352 |
| 2002/0137502 | A1 * | 9/2002 | Cronin et al. | 455/419 |
| 2002/0157090 | A1 * | 10/2002 | Anton, Jr. | 717/178 |
| 2002/0184619 | A1 | 12/2002 | Meyerson | |
| 2003/0041127 | A1 | 2/2003 | Turnbull | |
| 2004/0009871 | A1 | 1/2004 | Hu et al. | |
| 2004/0010786 | A1 * | 1/2004 | Cool et al. | 717/170 |
| 2004/0044999 | A1 * | 3/2004 | Gibson | 717/178 |
| 2004/0086097 | A1 * | 5/2004 | Olafsson | 379/93.32 |
| 2004/0136510 | A1 * | 7/2004 | Vander Veen | 379/88.22 |
| 2004/0168151 | A1 * | 8/2004 | Elteto | 717/120 |
| 2004/0181787 | A1 * | 9/2004 | Wickham et al. | 717/168 |
| 2004/0203682 | A1 | 10/2004 | Hinds et al. | |
| 2004/0221289 | A1 * | 11/2004 | D'Souza et al. | 718/102 |
| 2004/0224674 | A1 * | 11/2004 | O'Farrell et al. | 455/418 |
| 2004/0226008 | A1 * | 11/2004 | Jacobi et al. | 717/168 |
| 2005/0004982 | A1 * | 1/2005 | Vernon et al. | 709/204 |
| 2005/0007965 | A1 * | 1/2005 | Hagen et al. | 370/260 |
| 2005/0066019 | A1 * | 3/2005 | Egan et al. | 709/223 |
| 2005/0149922 | A1 * | 7/2005 | Vincent | 717/172 |
| 2005/0166199 | A1 * | 7/2005 | Willis | 717/173 |
| 2005/0172142 | A1 * | 8/2005 | Shelest et al. | 713/191 |
| 2006/0031828 | A1 * | 2/2006 | Won et al. | 717/168 |
| 2006/0050686 | A1 * | 3/2006 | Velez-Rivera et al. | 370/352 |
| 2006/0130045 | A1 * | 6/2006 | Wesley et al. | 717/168 |
| 2006/0143606 | A1 * | 6/2006 | Smith et al. | 717/175 |
| 2006/0159251 | A1 * | 7/2006 | Guillard et al. | 379/212.01 |
| 2006/0188078 | A1 * | 8/2006 | Jordan et al. | 379/207.01 |
| 2007/0214454 | A1 * | 9/2007 | Edwards et al. | 717/176 |
| 2008/0143817 | A1 * | 6/2008 | Miali et al. | 348/14.01 |
| 2008/0209413 | A1 * | 8/2008 | Kakumani et al. | 717/172 |
| 2008/0261603 | A1 * | 10/2008 | Sever et al. | 455/445 |
| 2008/0261657 | A1 * | 10/2008 | Amit | 455/558 |
| 2011/0185351 | A1 * | 7/2011 | Fawcett | 717/173 |
| 2012/0192173 | A1 * | 7/2012 | Price | 717/172 |

OTHER PUBLICATIONS

K&C Technologies, "Broadband IP Video Phone," http://www.knctech.com/products/ip-video-phone-spec.htm, pp. 1-2, (Jan. 12, 2004).

Grandstream Networks, Inc., "User Manual, BudgeTone-100 Series, IP Phone," http://www.grandstream.com/usermanuals/budgetone100.pdf, pp. 1-53, (2003).

ProVu Communications Ltd., "IP Videophone Software Upgrade", http://www.provu.co.uk/ipvideowvpupgrade.html, pp. 1-2, (May 24, 2007).

Huawei Technologies Co., Ltd., "ViewPoint® 8220 Videophone—Bring communication to life", http://64.251.193.166/uploadeddocs/102ViewPoint8220videophone.pdf, pp. 1-4.

* cited by examiner

METHOD AND SYSTEM FOR UPGRADING THE SOFTWARE OF A TELECOMMUNICATION TERMINAL, IN PARTICULAR OF A VIDEO TELEPHONE, AND RELATED COMPUTER PROGRAM PRODUCT

CROSS REFERENCE TO RELATED APPLICATION

This application is a national phase application based on PCT/EP2004/014715, filed Dec. 24, 2004.

FIELD OF THE INVENTION

The present invention relates to telecommunications technology, in particular to video telephone communication technology.

As used herein, "video telephone" (or, briefly, "videophone") is generally intended to encompass all those technologies enabling voice/video communications to take place on standard carriers for telephone communications.

DESCRIPTION OF THE RELATED ART

Transmitting voice and video signals on standard carriers used for transmitting speech signals (namely a standard telephone line) is made possible by compression techniques that reduce the bandwidth/bit-rate associated with those signals.

These techniques take advantage of the redundancy inherent in speech and video signals to produce a combined speech/video signal adapted to be transmitted without substantial impairment over telephone lines of standard telephone networks both of the fixed and the mobile type.

Video telephone communications have been the subject matter of extensive literature, including patent literature.

U.S. Pat. No. 6,545,697 B1 for example discloses a user system or device which uses a called number to establish a telephone call over a public telephone network to a called party. In response to the telephone call, the user system or device transfers a video call request to a server system over a public data network.

One problem related to the use of video telephone terminals is that their software may require to be upgraded. Software upgrades are used for example for adding new functionality, enhancing existing features, adding new features, and fixing bugs.

One possibility is upgrading the software off-line at a customer care centre or at the factory. This of course is inconvenient for the client and prevents the client using the terminal for a certain time.

A more practical and efficient way is upgrading the software on-line. Some telecommunication systems suitable for audio/video calls are in fact able to perform remote upgrading of the video telephone terminals, provided that also the video telephone terminals are configured for such operation.

It is known, for example, to make the remote software upgrade by using the TFTP (Trivial File Transfer Protocol) or the HTTP (Hypertext Transfer Protocol) protocols. Examples are provided by documents downloadable from web pages, such as the "Cisco VT Advantage" solution described in http://www.cisco.com/en/US/products/sw/voicesw/ps5662/ or the product illustrated by K&C Technologies in http://www.knctech.com/products/ip-video-phone-spec.htm. The remote software upgrade may however require manual operations, as described in the following documents: http://www.grandstream.com/user_manuals/budgetone100.pdf http://www.provu.co.uk/ipvideo_wvp_upgrade.html. The product VP 8220 sold by FutureWei has a self-detected software upgrade mechanism that frees the user from the hassles of performing, routine maintenance, as described in http://64.251.193.166/uploadeddocs/102 ViewPoint8220videophone.pdf The Applicant notes that, although the basic solution of remotely upgrading the software of a video phone is mentioned in these documents, no further detail is provided on how these techniques work.

US2004/009871A1 in the name of Motorola describes a technique for over-the-air management of software of a wireless device. In particular, a method of over-the-air updating of software of a wireless electronic device by a server is described, comprising the steps of: sending, via SMS, a patch notification message from the server to the wireless device, wherein receipt of the patch notification message initiates a patch agent on the wireless device; the server receiving parameters of the wireless device from the wireless device; the server determining a need for providing a predetermined software patch to the wireless device using the received parameters; and sending a software patch to the wireless device in response to the determining step, wherein the software patch is received, stored and installed on the wireless device by the patch agent.

This method may be started either by the server when a new DSP patch is available for the device, or by the user when the device has a problem, such as poor voice quality.

The Applicant observes that the software upgrading technique proposed in US2004/009871A1 is applicable to wireless systems and would be unsuitable to be applied in typical wired telephone networks; in fact, an SMS received by a POTS terminal would cause the terminal or other terminals attached to the same line to ring, which is undesired in such application. Moreover, the method described in US2004/009871A1 is started only when specific events occur, which can be either the availability of a new DSP software for the terminal in the server, or the incoming of problems in the terminal (such as poor voice, quality). The Applicant observes that a method providing a periodic check of the terminal status would be desirable.

OBJECT AND SUMMARY OF THE INVENTION

The Applicant has thus tackled the problem of providing an efficient and automatic method for remotely checking the software/hardware versions of a phone terminal, in particular a video phone terminal, and for upgrading the software of the terminal if required.

According to the present invention, that object is achieved by means of a method of remotely checking the software/hardware versions of a telecommunication terminal, in particular a video phone terminal, and for upgrading the software of the terminal, if required, having the features set forth in the claims that follow.

The method of the present invention comprises the steps of:
periodically making, from the terminal to a service center of the network, a telephone call to a phone number managed by the service center, containing information related to the current software and/or hardware version installed on the terminal;
checking, in the service center, if the current software and/or hardware version corresponds to a predetermined software and/or hardware version;
answering the call from the service center, sending to the terminal a second signal indicative of the result of said step of checking;

displaying to the customer the result of said step of checking if there is the need of an action of the customer The service centre can therefore make a continuous monitoring of the status of the terminals connected thereto and can activate an immediate upgrade of the software whenever required, also in those situations in which the presence of an old version of the software in the terminal does not alter the performances of the terminal.

This second signal is sent to the terminal by using a DTMF (Dual-Tone Multi-Frequency) sequence, which can be received by the terminal as an answer to the call made by the terminal itself, without affecting its normal functionalities or making it ring.

The invention also relates to a corresponding system and a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The arrangement described herein satisfactorily solves the problems mentioned in the introduction of the description.

The following detailed description of an exemplary embodiment of the invention provided in the following refers—for the sake of simplicity—to a videophone call involving two parties. However, those of skill in the art will promptly appreciate that the arrangement described herein may be applied to multi-party calls.

BRIEF DESCRIPTION OF THE ANNEXED DRAWINGS

The invention will now be described, by way of example only, by referring to the annexed figures of drawing, wherein.

DETAILED DESCRIPTION OF AN EXEMPLARY EMBODIMENT OF THE INVENTION

Figure 1:
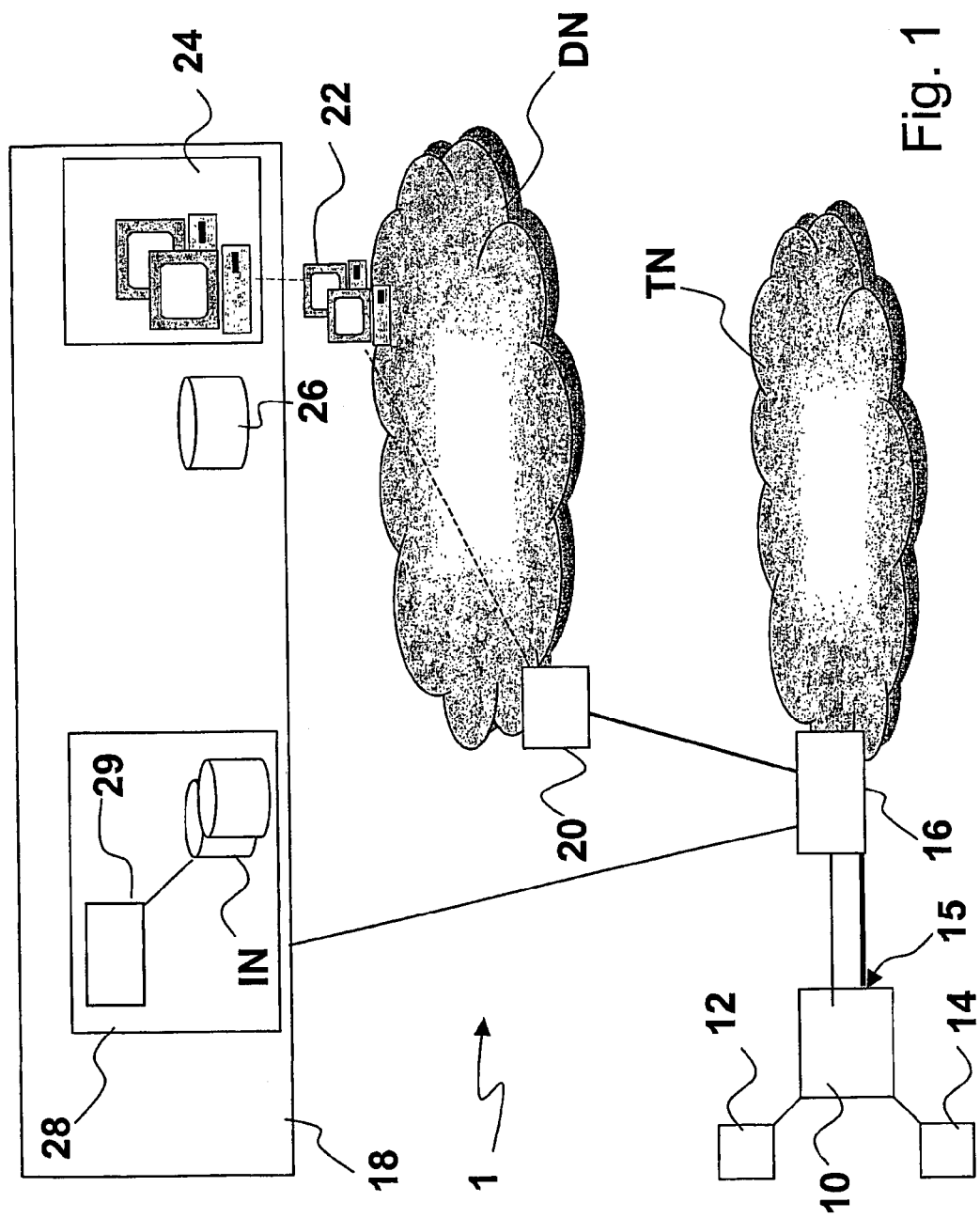
FIG. 1 is a block diagram showing a typical scenario of use of the arrangement described herein.

In the block diagram of FIG. 1, reference numeral 1 indicates a communication system including a telephone network TN, a packet switched data network DN, an intelligent network IN, and a video phone terminal 10 suitable to be connected to the telephone network TN and to the data network DT.

Network TN is a circuit-switched network, in particular a telephone network, adapted primarily to ensure speech communications between terminals such as terminal 10. Network TN is preferably a PSTN network. Data network DN is a packet-switched network, preferably an IP network.

The intelligent network IN is, as known in the art, a telecommunications network architecture in which processing capabilities for call control and related functions are distributed among specialized network nodes rather than concentrated in a switching system. The Signaling System 7 (SS7 network) enables the interaction with the IN infrastructure.

The terminal 10 is equipped with videophone facilities enabling it to transmit and receive both speech and video signals via user interfaces 12, 14.

Specifically, interface 12 is a speech interface typically comprised of a microphone and a loudspeaker. Interface 14 is a video interface usually comprised of a camera (such as a camera of the type currently referred to as a "webcam") and a screen (typically comprised of an LCD screen).

The terminal 10 may be advantageously a narrowband terminal of a type suitable to be connected to a telephone network, and is preferably provided with a single narrowband-type interface 15.

In the purely exemplary embodiment shown herein, the terminal 10 is connected to the network TN via a node (exchange) 16.

Connection of the node 16 with another node of the telephone network TN can be based on SS7 signaling system.

The data network DN comprises a Network Access Server (NAS) 20 providing access to the data network DN, a Service Center 18 and at least a Proxy RADIUS 22.

RADIUS (Remote Authentication Dial-In User Service) is a client-server protocol for providing authorization, identification, authentication, and accounting services for distributed dial-up/remote access networking. In particular, this protocol enables remote access equipment acting as RADIUS client (typically a dial-up server used by an ISP) to submit authentication and accounting requests (by sending specific user information) to a RADIUS server. The RADIUS server can thus validate the RADIUS client request.

Accordingly, the Proxy RADIUS 22 is a server used for managing remote access service, which has access to user account information and can check remote access authentication credentials. If the user's credentials are authentic and the connection attempt is authorized, the RADIUS server authorizes the user's access based on specified conditions and logs the remote access connections as accounting events.

The use of RADIUS allows the remote access user authentication and authorization and accounting data to be maintained in a central location, rather than on each network access server (NAS). The users connect to the RADIUS-compliant NAS 20 by running a Routing and Remote Access service which, in turn, forwards authentication requests to the centralized Internet Authentication Service (IAS) server.

The intelligent network IN is associated with a network element that is able to send DTMF signals 29, as an Intelligent Peripheral and with a data base of the different software and hardware versions available; on the intelligent network there is service logic used to check the SW/HW version of the terminal, knowing which are the last available versions thereof and sending appropriate DTMF signals to the terminal itself. The intelligent network with the appropriate service logic, the intelligent peripheral and the data base are referred to as "Check server" 28 that is part of the overall "Service Center" 18. Access to the intelligent network IN is made via the telephone network TN.

Preferably, the Service Center 18 includes a further database (not shown) adapted to collect information related to the SW/HW version of each of the terminals that accessed to the check server and to video phone calls established among terminals.

The Service Center 18 further comprises the functionalities for setting up the video communication (such as signaling processing and service logic execution) and a user Data Base (DB) 26 for storing both static and dynamic information regarding the system users registered on said service center.

Moreover, the Service Center 18 comprises a Management Server 24 suitable to identify the software and hardware versions of the terminal 10, to provide a downloadable version of the software and to manage the software upgrade.

Figure 2:
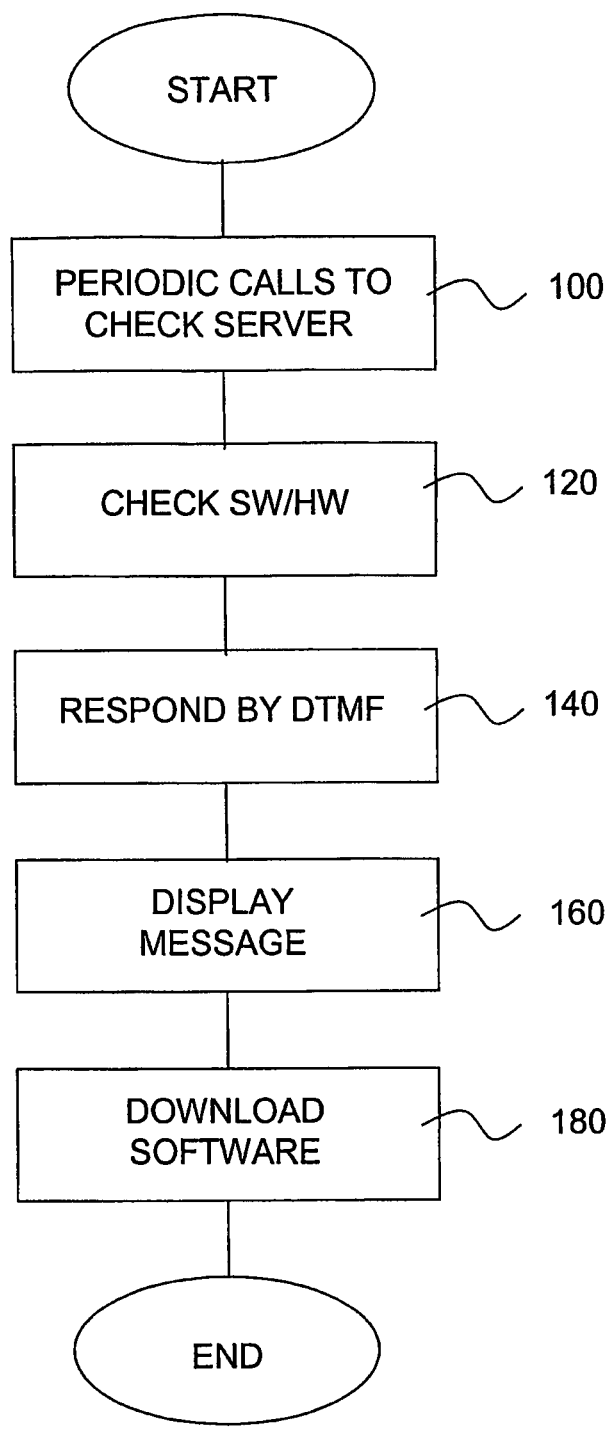
FIG. 2 is a flow chart summarizing the main steps of the method of the present invention.

FIG. 2 shows a flow chart summarizing the main steps of the method of the present invention.

The terminal 10 makes periodic and automatic calls to the Check Server 28 (block 100). For example, the terminal 10 can make a first automatic call when it starts working, then automatic calls at periodic times, such as every N hours. A reasonable interval between calls could be for example 240 hours. To this purpose, the terminal 10 is provided with a timer (not shown) that starts counting when the terminal starts working and triggers the calls every N hours. In case of power break, when the terminal 10 is newly started, the timer is reset and a new first call to the Check Server 28 is made.

The terminal 10 may also be configured to make the first call at a random time within a predetermined period from the time it starts working, so that, in case a large number of terminals have to call the Check Server 28 at the same time, for example after a power black-out in a certain area, these calls are not made all contemporaneously.

Each call contains information related to the current software and hardware versions of the terminal 10. Alternatively, each call could contain information related only to the current software version of the terminal 10, or, less preferably, only to the hardware version of the terminal 10. The information consists of a particular extension of the number dialled by the terminal to make the call. Each new version of the terminal will make the call with a different extension of the dialled number.

The Check Server 28 is thus able to check in a very simple and fast way if the current versions of the software and/or hardware of the terminal 10 match with the last available versions of the software and/or hardware (block 120).

These calls are performed by using a first service access code. $SAC_1$ containing routing information and information related to the terminal's software and hardware. In particular, the code $SAC_1$ is a multi-digit number, such as "abcdefgXY", comprising a first set of ciphers "abcdefg" (seven in this illustrative example) used to route the call towards the Intelligent Network IN and then to the Check Server 28, and a second set of ciphers "XY" (two in this illustrative example) that are representative of the current software and/or hardware versions of the terminal 10 and that allow the Check Server 28 to check the terminal 10 version.

Depending on the XY value, the Check Server 28 manages the calls in a different way, in particular it responds to the terminal 10 by a particular DTMF (Dual Tone Multi-Frequency) sequence of tones (block 140). The following is an exemplary way of managing the calls:

$XY_0$ indicates a correct (upgraded) terminal version, and the Check Server 28 responds by a DTMF sequence "00";

$XY_1$ indicates a terminal version that necessitates a software upgrade, but may continue making video calls, and the Check Server 28 responds by a DTMF sequence "01";

$XY_2$ indicates a terminal version that necessitates a software upgrade and is no more able to make video calls (so that the video call key must be disabled), and the Check Server 28 responds by a DTMF sequence "02";

$XY_3$ indicates a terminal version that necessitates a software upgrade, but may continue making video calls, and the last-version software can be immediately downloaded to the terminal in automatic; in this case the Check Server 28 responds by a DTMF sequence "03" and, terminated the announcement, routes the call to a software upgrading system;

$XY_4$ indicates a terminal version that necessitates a hardware upgrade, but may continue making video calls, and the Check Server 28 responds by a DTMF sequence "04";

$XY_5$ indicates a terminal version that necessitates a hardware upgrade and is no more able to make video calls (so that the video call key must be disabled), and the Check Server 28 responds by a DTMF sequence "05".

Depending on the received DTMF sequence, the terminal 10 reacts by displaying a corresponding message for the user on its display (block 160).

If the software has to be updated, a software download stage can be performed, started either by the user (by pressing a dedicated button or by selecting a specific option on the terminal 10), or automatically by the Service Center 18 (block 180).

In particular, the Service Center 18 may be configured to reroute, if the software can be updated in a short time (such as one minute or less), the call made with code SAC1 to the Management Server 24 of the Service Center 18, as will be described in greater detail with reference to FIG. 9.

The steps from 100 to 160 will be hereafter described in greater detail with reference to the flow charts of FIGS. 3 to 8. Three vertical lines are shown, which represent the different actions undertaken by the terminal 10, the node 16 and the Check Server 28. In all the flow charts, dashed lines indicate the signaling flow, while continuous lines indicate voice trunk flow signals.

Figure 3:
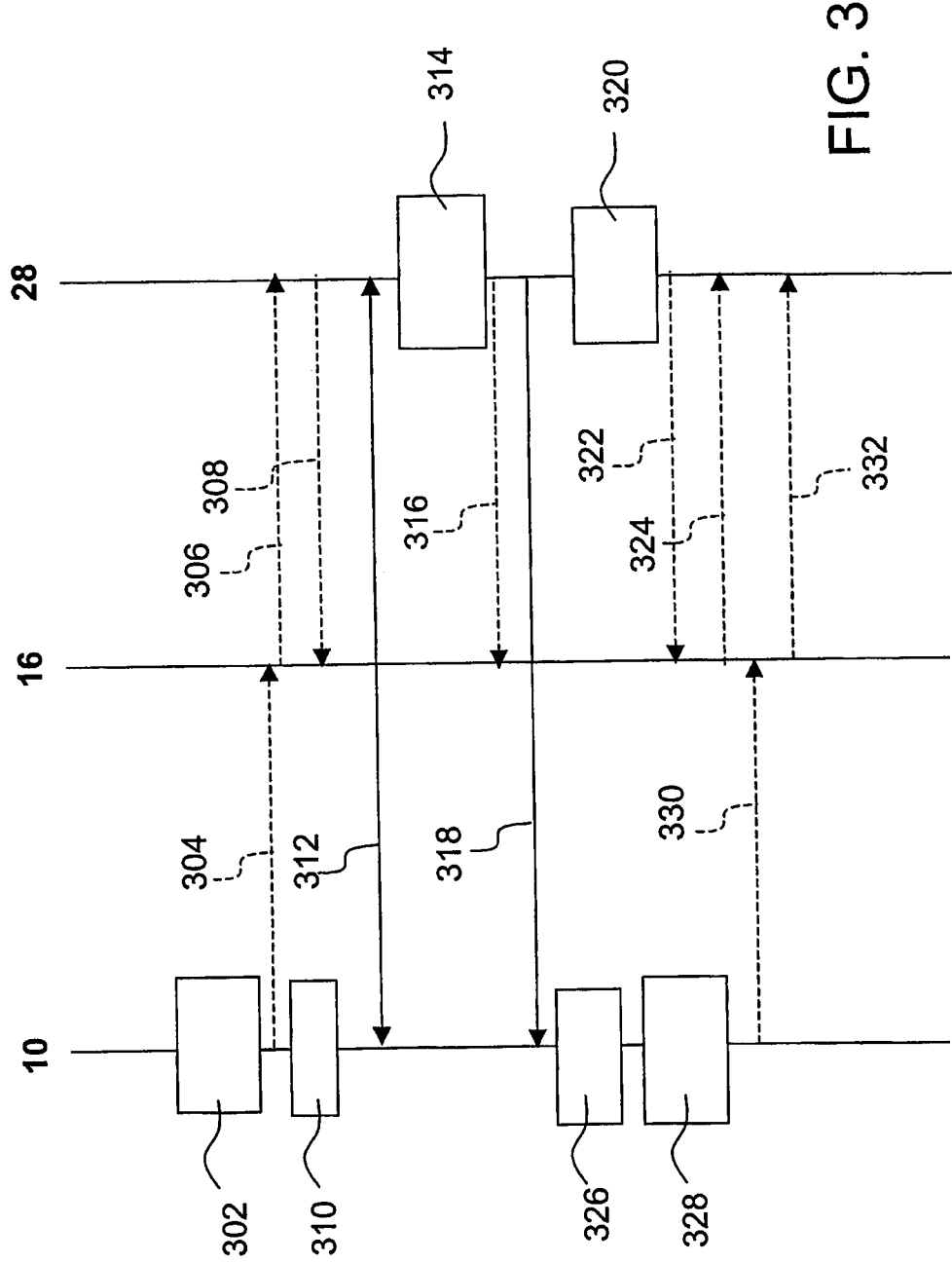
FIGS. 3 to 9 are flow-charts exemplary of a typical sequences of steps occurring in an exemplary embodiment of the arrangement described herein.

FIG. 3 relates to the situation wherein the terminal has the correct software/hardware version.

The procedure starts by a call from the terminal 10 toward the Check Server 28, by dialling of the code $SAC_1$ (step 302). Under this "off hook" condition, the dialed number is sent to the node 16 (step 304) by a multi frequency dialing, in particular by a Dual-Tone Multi-Frequency (DTMF) dialing.

The node 16 reacts by sending a combined IAM (Initial Address Message), SAMs (Subsequent Address Messages)—if any—to the Check Server 28, by using the code $SAC_1$ (step 306). The code $SAC_1$ comprises a XY code indicative of the current software/hardware version of the terminal 10; in this case, the code $SAC_1$ comprises a $XY_0$ code, which indicates a correct software/hardware version.

The Check Server 28 responds to the node 16 by an Address Completed Message (ACM) (step 308).

In the meanwhile, the terminal 10 has started a timer having set a predetermined timer T1, which allows the terminal 10 to handle the release procedure in case of missing tones receipt from the Check Server 28 (step 310).

A voice trunk is then established between the terminal 10 and the Check Server 28 (step 312).

Subsequently, the Check Server 28 analyses and checks the code $SAC_1$ to understand, through the XY digits, which is the software/hardware version installed on the terminal 10 (step 314).

In this case, code XY has the value $XY_0$, and the Check Server 28 understands that the software/hardware version currently installed on the terminal 10 is the correct version, so that the terminal 10 requires no update. Therefore, after sending an ANswer Message (ANM) to the node 16 (step 316), the Check Server 28 sends toward terminal 10 through the voice trunk a DTMF sequence "00" meaning "the software and hardware are OK" (step 318).

After sending the DTMF sequence, the Check Server 28 stores in the database the information that the terminal has the last release and starts the call release procedure (step 320) by sending a REL message to the node 16 (step 322). The node 16 responds to the Check Server 28 by a RLC message (step 324).

On reception of the DTMF sequence sent by the Check Server 28, the terminal 10 identifies the sequence and understands that no action has to be undertaken. Then, after waiting for a predetermined time T2 (step 326), the terminal 10 hangs up (step 328). An "on hook" signalling is sent from the terminal 10 to the node 16 (step 330) and an RLC signalling is sent from the node 16 to the Check Server 28 (step 332).

In case no DTMF sequence is received within the above-mentioned time T1, the call release procedure is automatically started.

Figure 4:
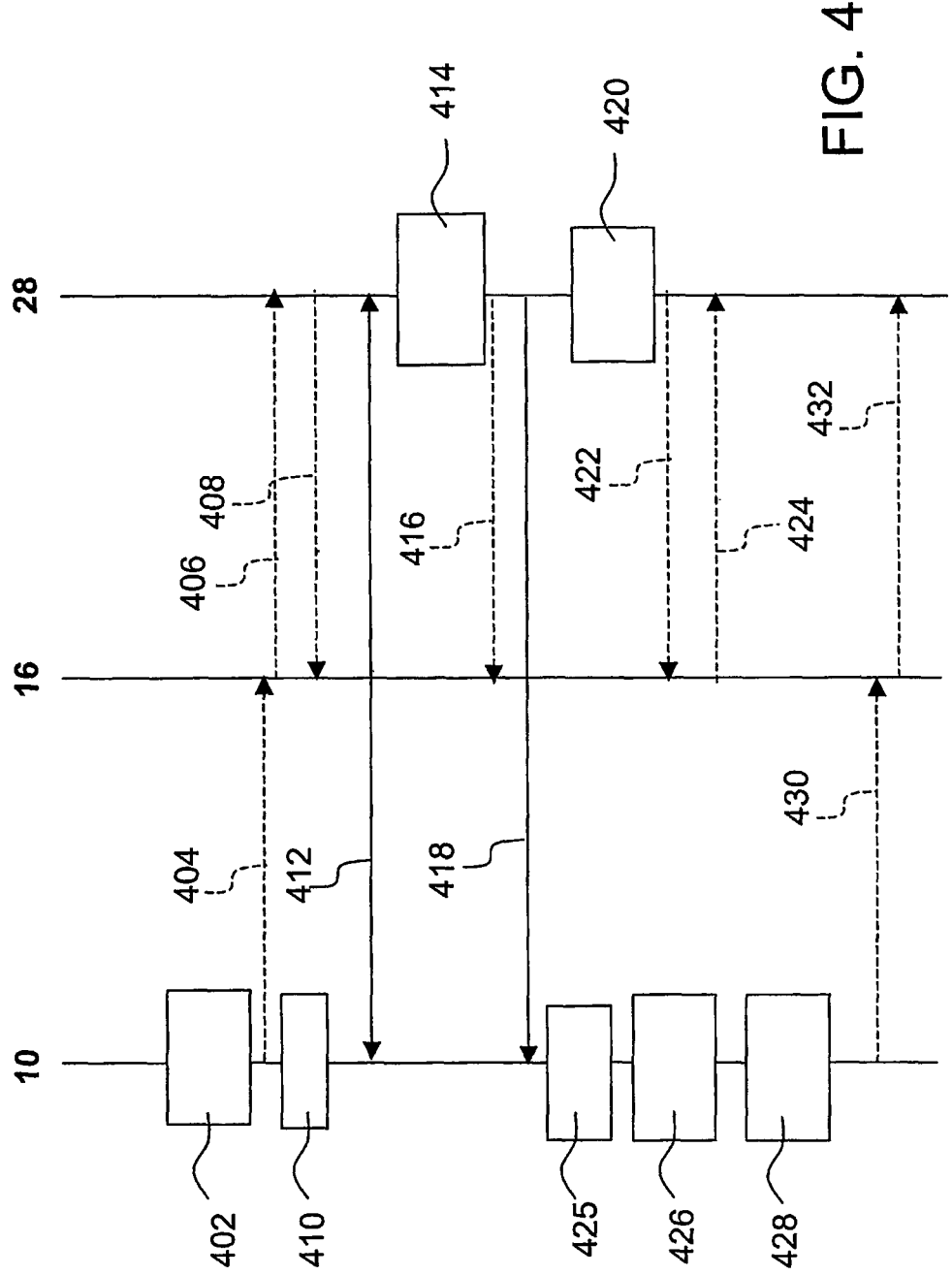

FIG. 4 relates to the situation wherein the terminal 10 has an old software version but de-activation of the "video" key is not required.

Steps from 402 to 424 differ from steps 302 to 324 only in that the code $SAC_1$ contains a code $XY_1$ indicative of this condition, and in that the DTMF sequence is a corresponding "01" sequence, meaning "upgrade software".

The terminal 10 reacts to the DTMF sequence "01" by displaying a message informing the user that a new software release is available and that it can be downloaded on-line (step 425). This message is preferably displayed until the customer handles the terminal 10. The steps that follow, from 426 to 432, are identical to the steps from 326 to 332.

Figure 5:
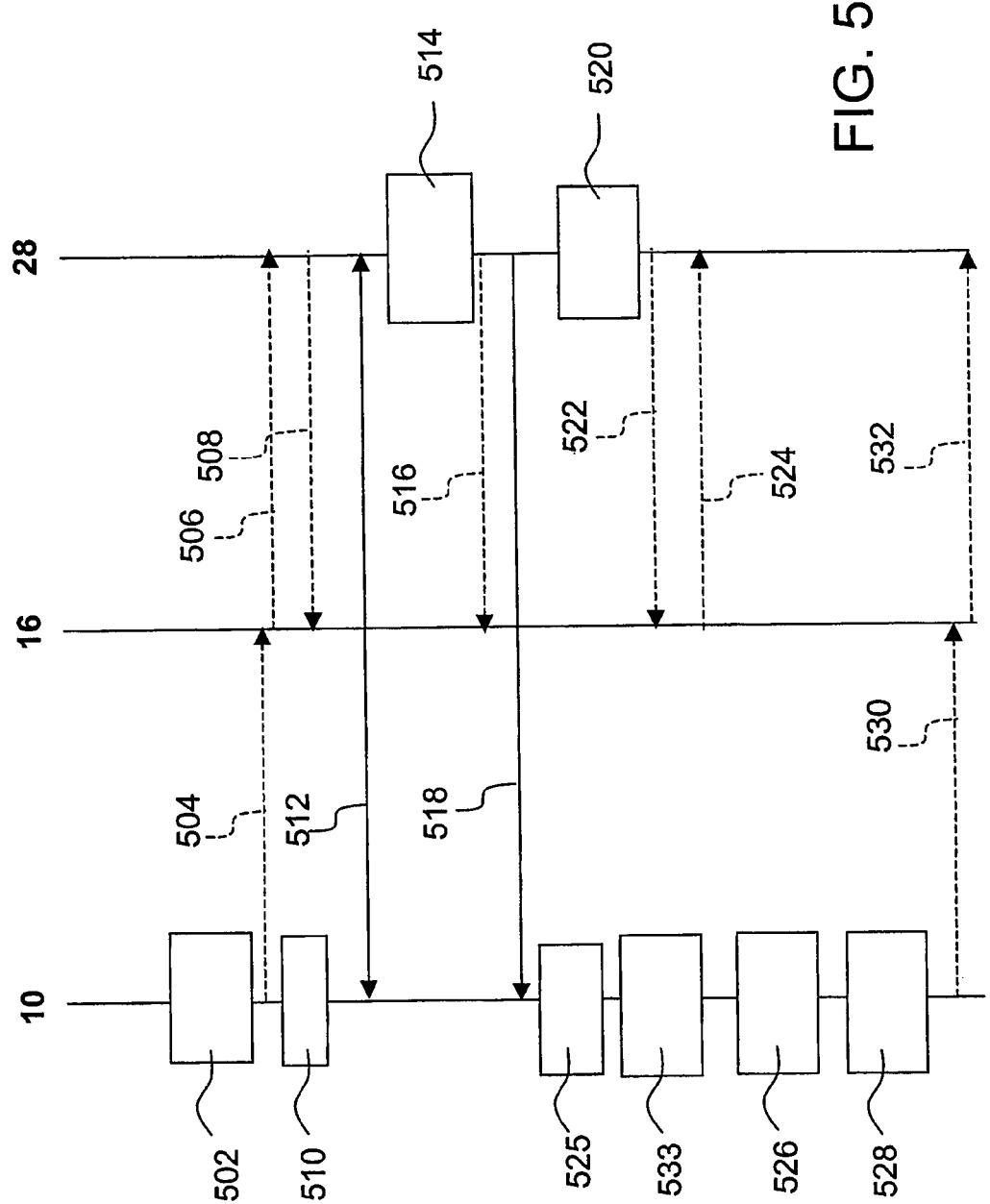

FIG. 5 relates to the situation wherein the terminal 10 has an old software version and de-activation of the "video" key is required.

Steps from 502 to 524 differ from steps from 302 to 324 only in that the code $SAC_1$ contains a code $XY_2$ indicative of the above condition, and in that the DTMF sequence is a corresponding "02" sequence, meaning "upgrade software and deactivate video key".

The terminal 10 reacts to the DTMF sequence "02" by displaying a message informing the user that the software is to be upgraded in order to exploit the video call services and that a correct version can be downloaded on-line (step 525). This message is preferably displayed until the customer handles the terminal 10. Moreover, the terminal 10 reacts by deactivating the "video" key on the terminal 10 (step 533).

The steps that follow, from 526 to 532, are identical to steps from 326 to 332.

Figure 6:
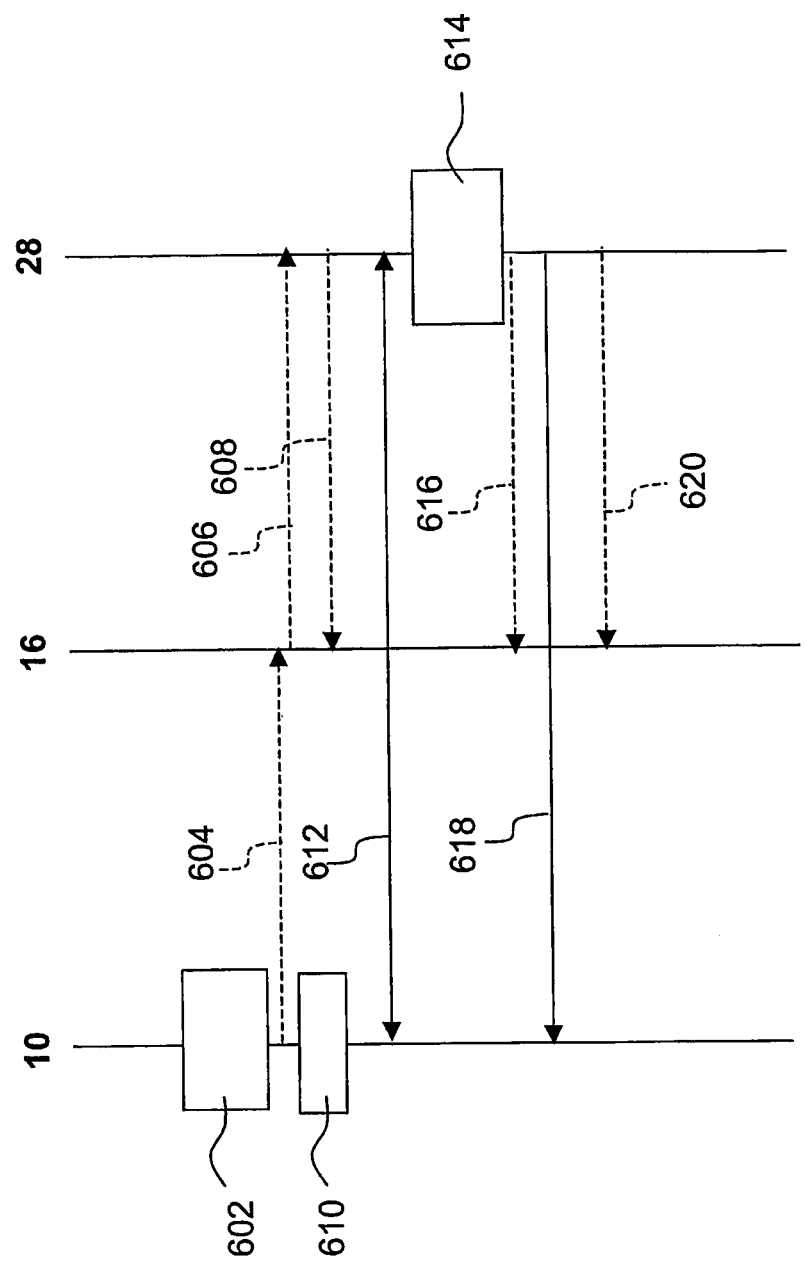

FIG. 6 relates to the situation wherein the terminal 10 has an old software version and the download of the new release can be performed automatically by the Check Server 28. This option can be used, for example, when the software can be updated in a short time (such as one minute or less).

Steps from 602 to 618 differ from steps 302 to 318 only in that the code $SAC_1$ contains a code $XY_3$ indicative of the above condition, and in that the DTMF sequence is a corresponding "03" sequence, meaning "automatic software upgrade".

In a subsequent step 620, the Check Server 28 sends to node 16 a combined IAM (Initial Address Message), SAMs (Subsequent Address Messages)—if any—, by using a second code $SAC_2$ different from the first code $SAC_1$ (step 306).

The following step is a calling dial-up of the terminal 10 to the service center and the method continues with the steps described in the following with reference to FIG. 9.

Figure 7:
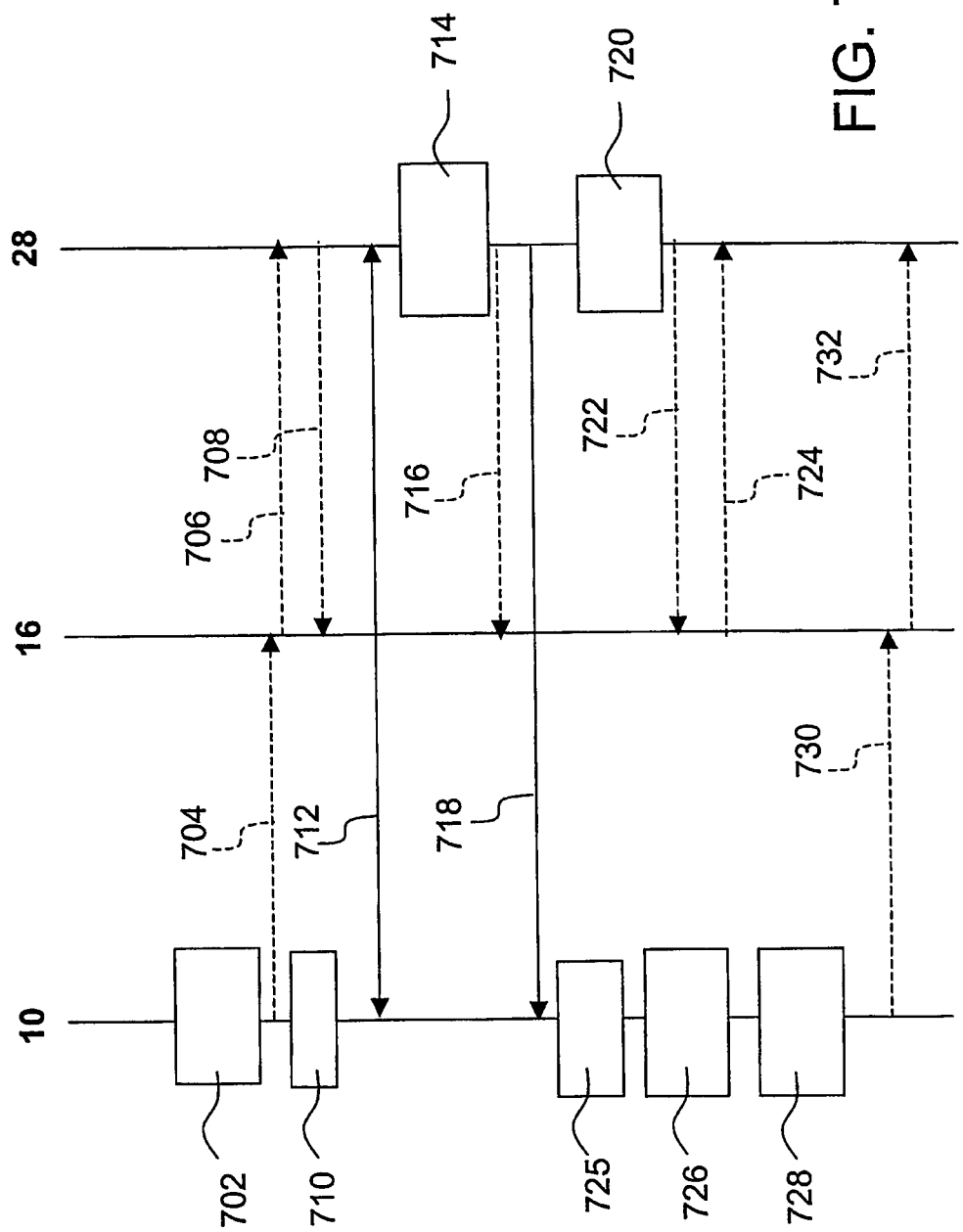

FIG. 7 relates to the situation wherein the terminal 10 has an old hardware version but de-activation of the "video" key is not required.

Steps from 702 to 724 differ from steps 302 to 324 only in that the code $SAC_1$ contain a code $XY_4$ indicative of this condition, and in that the DTMF sequence is a corresponding "04" sequence, meaning "upgrade hardware".

The terminal 10 reacts to the DTMF sequence "04" by displaying a message for informing the user that a new hardware version is available (step 725). This message is preferably displayed until the customer handles the terminal 10. The steps that follow, from 726 to 732, are identical to the steps from 326 to 332.

Figure 8:
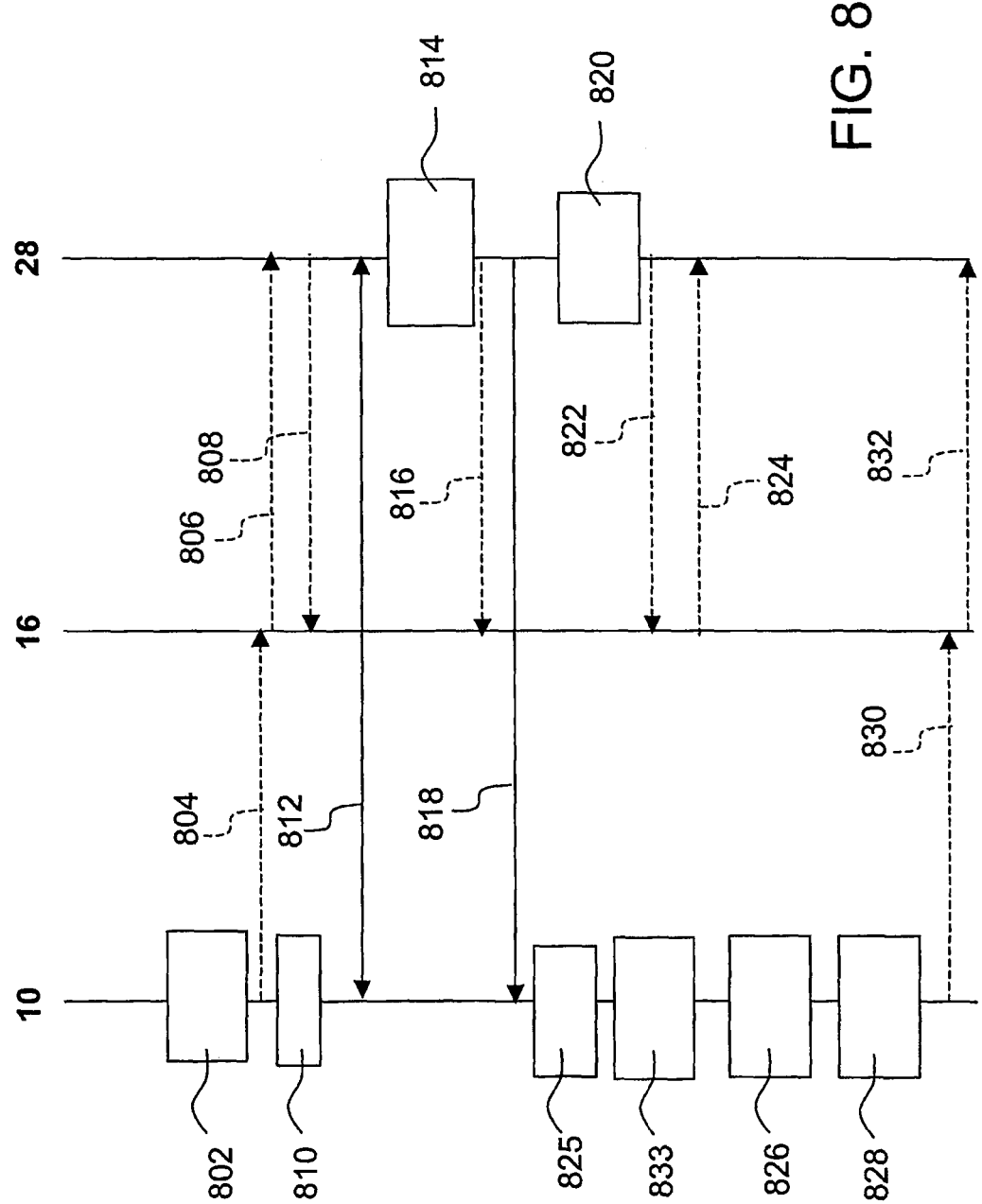

FIG. 8 relates to the situation wherein the terminal 10 has an old hardware version and de-activation of the "video" key is required.

Steps from 802 to 824 differ from steps from 302 to 324 only in that the code $SAC_1$ contains a code $XY_5$ indicative of the above condition, and in that the DTMF sequence is a corresponding "05" sequence, meaning "upgrade hardware and deactivate video key".

The terminal 10 reacts to the DTMF sequence "05" by displaying a message for informing the user that the hardware is to be upgraded in order to exploit the video call services (step 825). This message is preferably displayed until the customer handles the terminal 10. Moreover, the terminal 10 reacts by deactivating the "video" key on the terminal 10 (step 833).

The steps that follow, from 826 to 832, are identical to steps from 326 to 332.

Step 180 of FIG. 2 is hereafter described in greater detail with reference to the flow chart of FIG. 9.

Figure 9:
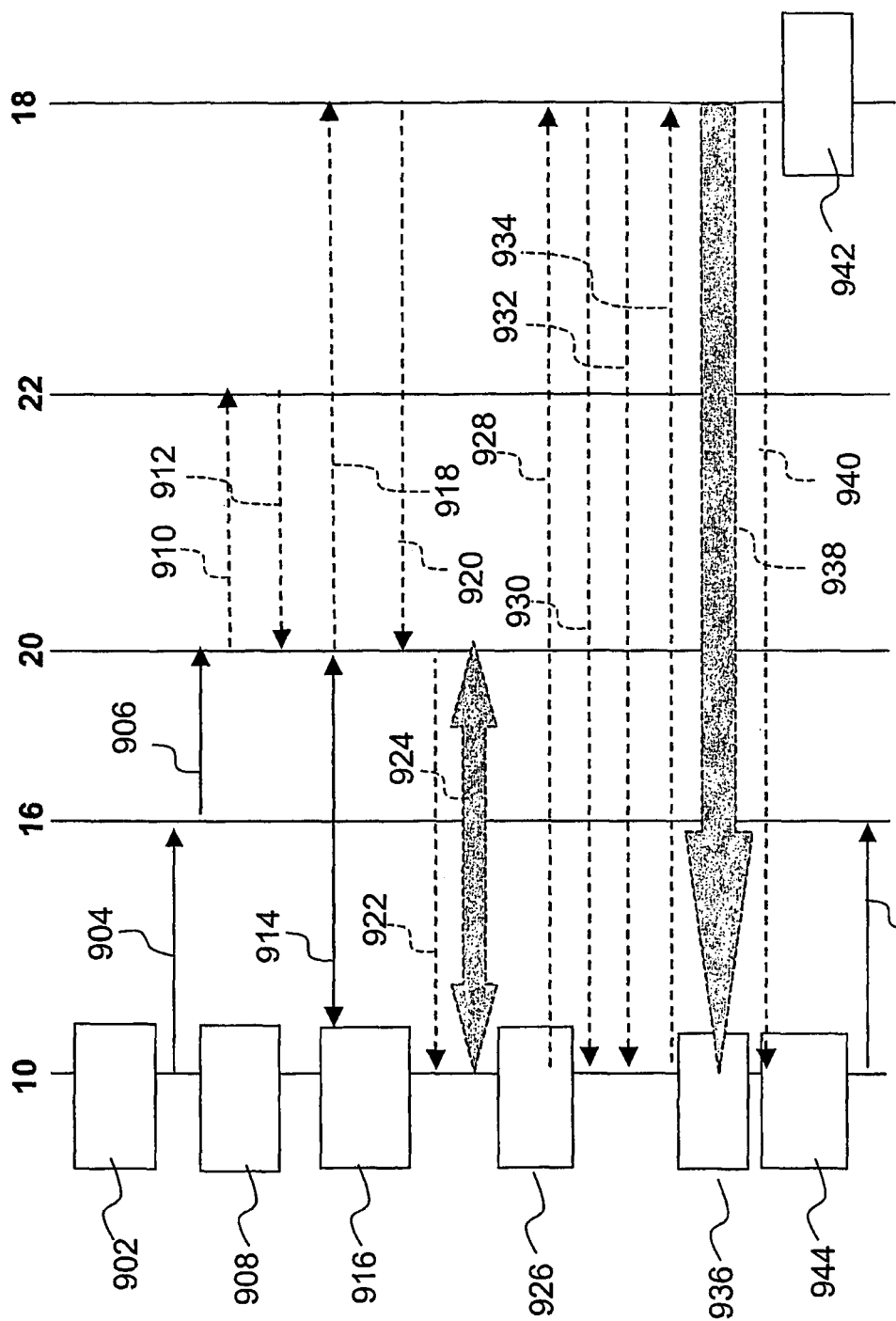

In particular, FIG. 9 shows the steps performed for remotely upgrading the software of the terminal 10.

To guarantee the software upgrade, the terminal 10 has to activate a TCP/IP connection with the Service Center 18, in particular with the Management Server 24.

In a first step, the terminal 10 activates a SAC call (step 902), by dialling the second code $SAC_2$. At the same time, it starts a timer for the upload procedure. The MF (Multi-Frequency) dialling (in a "off hook" condition) is received by the node 16 (step 904), which makes a setup call to the NAS 20 (step 906).

The terminal may optionally display a message for the user, such as "software upgrade in progress" (step 908). Then, a signalling exchange takes place between the NAS 20 and Proxy RADIUS 22 and between the Proxy RADIUS 22 and the Service Center 18, as hereafter described.

Alternatively to the above steps, the connection between the terminal 10 and the Management Server 24 may be activated directly by the Service Center 18, by rerouting the call made with the first code $SAC_1$ to the Management Server 24. This process option is automatically performed if the time required for the software download is estimated as very short (such as one minute or less). The reason for this is that, if the customer has a POTS access to the telephone network, during the upload procedure the line is busy and the customer cannot receive or make phone calls; so if the software download takes a long time the customer has to be aware of it and it is preferable that the customer agrees on it.

The NAS 20A sends (step 910) an Access Request (or Preauthentication Request) to the Proxy RADIUS 22. The Proxy RADIUS 22 then locates the appropriate service-level agreement (SLA) that limits calls per service, and makes sure that the current call is within the limits (step 912). If the call is outside the limits, the call is rejected and an error code is returned (not shown) to the NAS 20. If adequate resources exist for the call and the call falls within SLA limits, the call is accepted and the Proxy RADIUS 22 sends an Access Accept message to the NAS 20.

The following steps are then performed to establish a dial-up session.

A PPP (Point-to-Point Protocol) connection is performed between the terminal 10 and the NAS 20, by which the TCP/

IP communication parameters are exchanged and the network interfaces are activated (step 914).

The first terminal 10 starts using its modem (which is preferably a V.92 modem), as represented by step 916.

A user authentication process is then performed. The NAS 20 sends authentication information (received through the PPP handshaking) to the Service Center 18 by means of an Access Request packet (step 918). This packet contains attributes such as the user's name, the user's password, the ID of the client and the Port ID the user is accessing.

If no response is returned within a predetermined time, the request can possibly be re-sent a number of times.

After receiving the request, the Service Center 18 validates the sending client. Validation occurs by verifying that the RADIUS Access-Request packet is sent from a configured RADIUS client. If the RADIUS client is valid, the Service Center 18 consults a database of users to find the user whose name matches the request. The user account contains a list of requirements that must be met to allow access for the user. This can include verification of the password, but can also specify whether the user is allowed to access.

If any condition where the authentication or authorization is not met, the Service Center 18 sends a RADIUS Access-Reject packet in response (not shown), indicating that this user request is invalid.

If all conditions are met, the Service Center 18 sets a list of configuration values for the user and places these parameters into a RADIUS Access-Accept packet that is sent back (step 920) to the RADIUS client, i.e. to the NAS 20. These values include a list of RADIUS attributes and all necessary values to deliver the desired service. For PPP service type, this can include values such as: address of the terminal on the data network (e.g. IP address), address of the service center (e.g. IP address), subnet mask, MTU, desired compression, and desired packet filter identifiers.

The configuration values are communicated to the terminal 10 by the NAS 20 by using the PPP protocol (step 922). These parameters, which will be used for setting up the video communication, are stored in the terminal 10.

The IP flow can then start (step 924).

The terminal 10 then activates its SNMP agent (step 926) and, by using its IP Address, generates a SNMP Trap, which is sent to the Service Center 18, in particular to the Management Server 24 (step 928).

The Management Server 24 contacts the terminal 10 via SNMP to check the software version and configuration (step 930).

If necessary, Management Server 24 instructs the terminal 10 to download one or more software modules from a FTP server (not shown), which may be located in the Service Center 18 (step 932).

The terminal 10 then contacts the FTP server (step 934) and starts file download (step 936). Software download is thus performed (step 938).

The Service Center 18, in particular the Management Server 24, monitors the FTP download and checks if the FTP download is completed. When the FTP download is completed, the Management Server 24 commands the reboot of terminal 10 by forcing the activation of the downloaded software (step 940).

The Management Server 24 ends the download session storing in the local DB the information about the upgraded VDT (step 942).

The terminal 10 may then display a message of successful download for the user, such as "download completed" (step 944).

Finally, an "on hook" signalling is sent from the terminal 10 to the node 16 (step 946).

Of course, without prejudice to the underlying principles of the invention, the details and the embodiments may vary, also significantly, with respect to what has been described and shown merely by way of example, without departing from the scope of the invention as defined by the annexed claims.

The invention claimed is:

1. A method of upgrading the software of a telephone terminal of a telecommunication network, comprising:
   periodically making, from the terminal to a service center of said network, a telephone call to a number managed by said service center, said telephone call containing information related to the current software version installed on the terminal;
   receiving, at the terminal, a result signal as an answer to said telephone call without affecting the terminal's ability to receive or make phone calls, and prior to activating a data connection between the terminal and said service center, wherein said result signal comprises a dual-tone multi-frequency sequence indicating whether the current software version corresponds to a correct software version, and whether or not a software upgrade is necessary to maintain one or more features of the terminal;
   estimating a period of time required for a necessary software download and automatically activating the data connection between the terminal and a management server included in said service center if the estimated time period is below a threshold; and
   receiving from the management server a download of software for the upgrade, the download being managed by the management server.

2. The method of claim 1, wherein periodically making a telephone call comprises making a telephone call to a service access code.

3. The method of claim 2, wherein the service access code comprises a first set of ciphers used to route the telephone call toward an intelligent network and a second set of ciphers indicative of the current software version installed on the terminal.

4. The method of claim 1, wherein the terminal is a wired video telephone.

5. The method of claim 1, wherein the telephone call is sent to an intelligent network.

6. The method of claim 1, wherein the telephone call is received by a check server that is part of the service center and that comprises a data base containing information on the different software versions available.

7. The method of claim 6, wherein the method comprises automatically rerouting said telephone call to said management server configured to provide a downloadable version of the correct software.

8. The method of claim 1, further comprising displaying a message on said terminal based on said result signal.

9. The method of claim 1, further comprising checking if the current software version is suitable for video connection.

10. The method of claim 9, wherein, if the current software version is unsuitable for video connection, the result signal contains information related to the fact that the current software version is unsuitable for video connection.

11. The method of claim 10, further comprising the step of deactivating a video functionality in the terminal if the result signal contains information related to the fact that the current software version is unsuitable for video connection.

12. The method of claim 1, wherein, if the current software version does not correspond to the correct software version, the result signal contains information related to the availability of the correct software version, and the method further comprises remotely downloading said predetermined software version.

13. The method of claim 12, wherein downloading said predetermined software version comprises activating a Transmission Control Protocol/Internet Protocol connection between the terminal and the service center.

14. The method of claim 13, wherein activating a Transmission Control Protocol/Internet Protocol connection between the terminal and the service center comprises establishing a dial-up session by using a point-to-point protocol.

15. The method of claim 1, wherein the telephone call contains information related to a current hardware version installed on the terminal.

16. The method of claim 15, wherein the result signal also indicates whether the current hardware version corresponds to a correct hardware version.

17. The method of claim 1, wherein the terminal is a video telephone.

18. A system for upgrading the software of a telephone terminal of a telecommunication network, comprising:
   a telephone terminal configured to periodically make a telephone call to a phone number managed by a service center of said telecommunication network, said telephone call containing information related to the current software version installed on the terminal; and
   a check server, in said service center, comprising one or more databases, said check server and said database being configured to:
      receive said telephone call,
      check if the current software version corresponds to a predetermined software version,
      answer said telephone call by sending a result signal without affecting the terminal's ability to receive or make phone calls, and prior to activating a data connection between the terminal and said service center, wherein said result signal comprises a dual-tone multi-frequency sequence indicating the result of said step of checking, and whether or not a software upgrade is necessary to maintain one or more features of the terminal; and
      estimate a period of time required for a necessary software download, and automatically activate the data connection between the terminal and a management server included in said service center if the estimated time period is below a threshold, wherein the management server is configured to manage download of software for the upgrade.

19. The system of claim 18, further comprising an intelligent network for managing the telephone call and checking said one or more databases using a service access code contacted by said telephone call.

20. The system of claim 18, wherein the terminal is a video telephone.

21. The system of claim 18, wherein the terminal is a wired video telephone.

22. The system of claim 21, wherein the terminal is a video telephone terminal having a single network interface of a narrowband type.

23. The system of claim 18, further comprising a packet-switched network comprising said service center, said service center being configured to provide said correct software version for on-line downloading.

24. A telephone terminal, configured to:
   periodically make a telephone call to a phone number managed by a service center, said telephone call containing information related to the current software version installed on the terminal,
   receive a result signal without affecting the terminal's ability to receive or make phone calls, and prior to connecting the terminal and a management server included in said service center, wherein said result signal comprises a dual-tone multi-frequency sequence indicating whether or not a software upgrade is necessary to maintain one or more features of the terminal,
   automatically connect to the management server, if an estimated time period required for a necessary software download is below a threshold; and
   receive from the management server a download of software for the upgrade, the management server being configured to manage the download.

25. The telephone terminal of claim 24, wherein the terminal is a video telephone terminal.

26. A non-transitory computer readable medium encoded with instructions that, when executed by at least one computer of a telephone terminal of a telecommunication network perform a method of upgrading the software of the terminal comprising:
   periodically making, from the terminal to a service center of said network, a telephone call to a number managed by said service center, said telephone call containing information related to the current software version installed on the terminal;
   receiving, at the terminal, a result signal as an answer to said telephone call without affecting the terminal's ability to receive or make phone calls, and prior to activating a data connection between the terminal and said service center, wherein said result signal comprises a dual-tone multi-frequency sequence indicating whether the current software version corresponds to a correct software version, and whether or not a software upgrade is necessary to maintain one or more features of the terminal;
   estimating a period of time required for a necessary software download, and automatically activating the data connection between the terminal and a management server included in said service center if the estimated time period is below a threshold; and
   receiving from the management server a download of software for the upgrade, the download being managed by the management server.

* * * * *